(12) United States Patent
Murrell et al.

(10) Patent No.: US 6,961,748 B2
(45) Date of Patent: *Nov. 1, 2005

(54) UNIFORM NETWORK ACCESS

(76) Inventors: Stephen J. Murrell, 6250 SW. 64th Ct., Miami, FL (US) 33143; Henry L. Hamman, 7260 SW. 34th Street Rd., Miami, FL (US) 33155

( * ) Notice: Subject to any disclaimer, the term of this patent is extended or adjusted under 35 U.S.C. 154(b) by 244 days.

This patent is subject to a terminal disclaimer.

(21) Appl. No.: 10/361,920

(22) Filed: Feb. 10, 2003

(65) Prior Publication Data

US 2003/0135630 A1 Jul. 17, 2003

Related U.S. Application Data

(63) Continuation-in-part of application No. 09/310,411, filed on May 12, 1999, now Pat. No. 6,519,625
(60) Provisional application No. 60/105,858, filed on Oct. 27, 1998.

(51) Int. Cl.[7] ............................................. G06F 13/00
(52) U.S. Cl. ....................................... 709/202; 709/227
(58) Field of Search ................................ 709/200, 201, 709/202, 203, 207, 217, 218, 219, 226, 227, 228, 229, 224, 223; 707/10

(56) References Cited

U.S. PATENT DOCUMENTS

| | | | |
|---|---|---|---|
| 5,339,435 A | 8/1994 | Lubkin et al. ............... | 717/121 |
| 5,742,829 A | 4/1998 | Davis et al. ................. | 717/178 |
| 5,754,857 A | 5/1998 | Gadol ......................... | 709/203 |
| 5,761,499 A | 6/1998 | Sonderegger ................ | 707/10 |
| 5,867,161 A | 2/1999 | Walsh ......................... | 345/347 |
| 5,893,107 A | 4/1999 | Chan ........................... | 707/103 |
| 5,893,116 A | 4/1999 | Simmonds et al. .......... | 707/201 |
| 5,923,885 A | 7/1999 | Johnson et al. ............. | 717/176 |
| 5,991,807 A * | 11/1999 | Schmidt et al. ............. | 709/225 |
| 6,031,977 A | 2/2000 | Pettus ......................... | 709/230 |
| 6,049,819 A * | 4/2000 | Buckle et al. ............... | 709/202 |
| 6,055,373 A | 4/2000 | McElroy et al. ............ | 712/135 |
| 6,061,349 A | 5/2000 | Coile et al. .................. | 707/10 |
| 6,067,086 A | 5/2000 | Walsh ......................... | 345/347 |
| 6,067,577 A | 5/2000 | Beard ......................... | 709/331 |
| 6,078,990 A | 6/2000 | Frazier ....................... | 711/114 |
| 6,081,812 A | 6/2000 | Boggs et al. ................ | 707/202 |
| 6,105,122 A | 8/2000 | Muller et al. ................ | 712/1 |
| 6,115,549 A | 9/2000 | Janis et al. .................. | 707/10 |
| 6,128,647 A | 10/2000 | Haury ......................... | 709/207 |
| 6,148,349 A | 11/2000 | Chow et al. ................. | 716/33 |
| 6,353,850 B1 * | 3/2002 | Wies et al. .................. | 709/203 |
| 6,353,856 B1 * | 3/2002 | Kanemaki .................... | 709/229 |
| 6,449,344 B1 | 9/2002 | Goldfinger | |
| 6,519,625 B1 * | 2/2003 | Murrell et al. .............. | 709/202 |
| 6,859,819 B1 * | 2/2005 | Rosenberg et al. .......... | 709/203 |

* cited by examiner

*Primary Examiner*—Moustafa M. Meky

(57) ABSTRACT

According to some embodiments, a registry is displayed. The registry may, for example, indicate resources available from a plurality of remote network access devices via a communications network. Moreover, a personal network address may be associated with each available resource, the personal network address including an destination address portion and an application program identifier portion. A direct communications link may then be established between a first network access device hosting an available resource and a second network address device using the personal network address associated with the resource.

22 Claims, 9 Drawing Sheets

UNIFORM NETWORK ACCESS

CROSS-REFERENCE TO RELATED APPLICATIONS

The present application is a continuation-in-part of U.S. patent application Ser. No. 09/310,411 filed May 12, 1999 (issued as U.S. Pat. No. 6,519,625), which claimed the benefit of U.S. Provisional Patent Application No. 60/105,858 filed Oct. 27, 1998. The entire contents of those application are incorporated herein by reference.

BACKGROUND

Communications networks, including the Internet, have been used to access resources located on various network access devices. Typically, a user may transfer data files, including text, application files, voice and video with electronic network access devices. As the size and complexity of available communications networks has increased, methods of conveniently transferring data across various software platforms have been sought.

In order to deliver a message to an agent via an electronic communications network, it is necessary to address the computer and the application software accessed by the agent. Typically, an Internet Protocol (IP) address is used to identify the computer. Application software is commonly addressed to a port number on the computer. A computer may have thousands of ports available. Each port can connect to only one application. However, an application may connect to multiple ports. A combination of the IP address and port number allows a message to be delivered properly to a designated application program. In this way, an Internet message is first delivered to an IP address associated with a computer and then delivered to the specific port on the computer running application software associated with the message.

Fixed IP addresses are not widely available to independent users. It is common for domestic and small business users to access a network such as the Internet via an Internet Service Provider (ISP). ISPs can act as a redirecting service and assign a temporary IP address to a computer contacting the service provider. The temporary IP address is used by that computer during one contiguous computing session. When a computing session ends, the ISP, or other re-directing service, makes a previously allocated computer address available to a subsequent request to initiate an Internet computing session. An address is consistent for a user during any continuous computing session.

Similarly, port numbers are not commonly allocated on a fixed basis. On a shared processor, such as a mainframe, shared port numbers are allocated to application programs as various users invoke the applications. On single user machines such as PCs, all port numbers are available to a user. However, multiple instances of an application program may be enabled for concurrent execution. Each instance must be assigned a unique port Ports are therefore assigned on an as-requested basis.

Due to the allocation and re-allocation of IP addresses and port numbers with each new computing session, it is difficult for a user to track the address of another party with which the user may wish to communicate. Without an address, it is difficult to communicate directly across a network.

In response to the problem of changing addresses, systems have been implemented using centralized servers that maintain a permanent IP address and port number. Often, specially designated programs may be allocated a port number for that special program's permanent exclusive use. In this way, an agent can locate the centralized server and communicate with it. If appropriate, the centralized server can forward a message to another agent who has also identified itself to the communications server. The centralized server acts as a hub for all communication. However, if the centralized server or a communications link to the server should fail, all communications cease.

In addition, permanent address centralized servers typically require set up and maintenance by technical personnel. Applications running on the servers, such as an email or database application, may require a particular computing platform to execute the application software. With the proliferation of computing platforms such as Microsoft Windows, Unix, DOS, and IBM OS2, it becomes increasingly difficult to support multiple platforms.

Multiple services in the form of resources and applications can be available on a network. Typically, a discrete service requires a unique access interface. In addition, different operating systems are often manifested in different interfaces.

It would be useful therefore to have a method of communicating that does not require a centralized server and is executable across multiple platforms.

SUMMARY

A uniform network access mechanism, or interface, can enable a network agent to access multiple discrete network services; the uniform network access mechanism can include software operative on multiple operating systems and executed on a network access device. In one aspect, groups of loosely interconnected agents can communicate contemporaneously or at various times without intermediaries such as servers.

Communications can include text, voice, files and database access. Agents can include human users utilizing network access devices, such as a personal computer, or robot machines that are programmed to respond like humans. In another aspect, agents operating on different operating system platforms can use an equivalent interface.

The operating systems can include the Disk Operating System (DOS)™, Windows 95™, Windows NT™, UNIX, Apple Mac OS, or other operating systems. The software can display a registry of discrete services available on a network and implement communication with a discrete resource listed on the registry as available.

In general, in one aspect, a discrete resource is identified with a Personal Network (PeN) address comprising an Internet Protocol address and a port number. In another aspect, the software can be additionally operative to coordinate the sending and receipt of data packets. A data packet can be received and parsed wherein an action responsive to the content of a received packet can be performed.

In general, one response to packet content can construct a network socket with associated input and output streams and add it as a triplet to a multiplexer IOStreamList. A multiplexer can coordinate multiple communications to a discrete service available on the network.

In another aspect, in general, a discrete service can include a database query, a mail message, a chat message or a file transfer request. A communication or other data stream can also be encrypted to provide security against unauthorized access.

In general, in another aspect, the invention includes a uniform user interface invocable by a command on a network access device. The user interface can include a first display region for a registry to list available network agents and resources. In a second display region, a log of communication events occurring between resources and agents can e displayed. A third display region can include user interactive controls to perform registry functions. A fourth display region can list available network functions and user interactive controls to enable or disable said network functions. In still another aspect, a PeN virtual network can coordinate network access devices linked by a communications network. Software running on a network access device can create a registry coordinating PeN resources, the registry can list unique PeN addresses for each resource and facilitate communications directly between network access devices.

DETAILED DESCRIPTION

Figure 1:
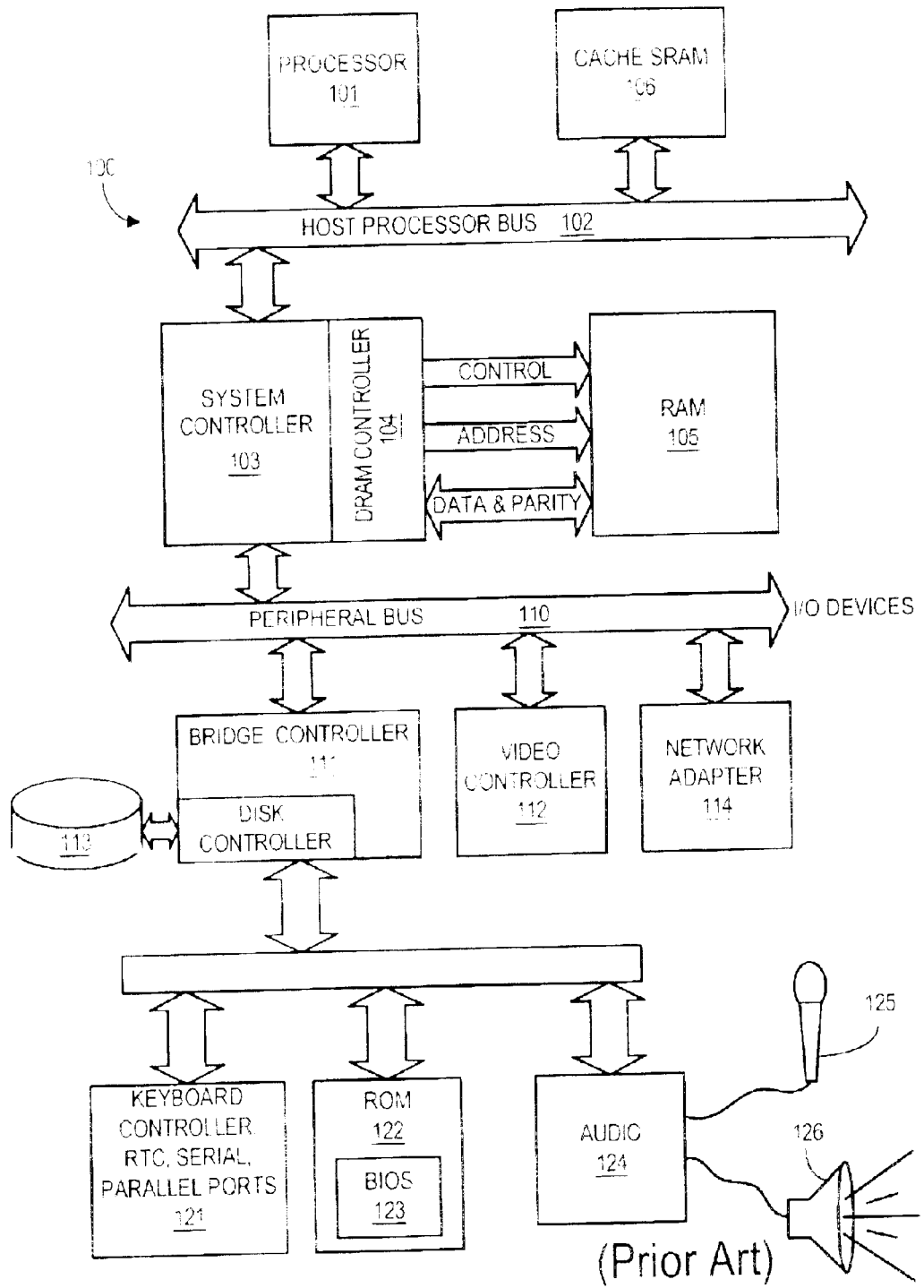
FIG. 1 illustrates a computer.

FIG. 1 depicts physical resources of a computer 100. The computer 100 has a processor 101, such as a Central Processing Unit (CPU) connected to a processor host bus 102 over which it provides data, address and control signals. The processor 101 may be any conventional, general purpose, single- or multi-chip microprocessor such as a Pentium® processor, a Pentium® Pro processor, a Pentium II® processor, a MIPS® processor, a Power PC® processor or an ALPHA® processor. In addition, the processor 101 may be any conventional special purpose microprocessor such as a digital signal processor or a graphics processor. The processor 101 has conventional address, data and control lines coupling it to the processor host bus 102.

The computer I 00 includes a system controller 103 having, an integrated RAM memory controller 104. The system controller 103 can be connected to the processor host bus 102 and provide an interface to Random Access Memory (RAM) 105. The system controller 103 can also provide a host bus to peripheral bus bridging functions. The system controller 103 can thereby permit signals on the processor host bus 102 to be compatibly exchanged with signals on a peripheral bus 110. The peripheral bus 110 may be, for example, a Peripheral Component Interconnect (PCI) bus, an Industry Standard Architecture (ISA) bus or a MicroChannel bus. Additionally, the system controller 103 can provide data buffering, and data transfer rate matching, between the host processor bus 102 and peripheral bus 110. The system controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a video controller 112 and network adapter 114 can be coupled to the peripheral bus 110. The network adapter 114 may be a modem, an Ethernet networking card, a cable modem or other network access circuitry.

The computer 100 can also include nonvolatile Read Only Memory (ROM) 122 to store basic computer software routines. An operating system boot operation can occur after the computer 100 is turned on and power-on self-test (POST) routines stored in the BIOS 123 complete execution. During the boot process, the processor 101 executes BIOS 123 software to access a bridge controller 111 (e.g., including a disk controller) or network adapter 114 and thereby obtain a high-level operating system. The high-level operating system may be, for example, the Disk Operating, System (DOS)™, Windows 95™, Windows NT™, UNIX, Apple Mac OS™ or other operating systems.

An operating system may be fully loaded in the RAM memory 105 or may include portions in RAM memory 105, disk drive storage 113, or storage at a network location. An operating system, such as Windows 95™ or Windows NT™, provides functionality to control computer peripherals, such as devices 112–114, 121, and 124, and to execute user applications. User applications may be commercially available software programs such as personal network software, word processing, spreadsheets, Internet access software and many other types of software. User applications may access computer system peripherals 112–114 through an Application Programming Interface (API) provided by the operating system and/or may directly interact with underlying computer system 100 hardware.

Figure 2:
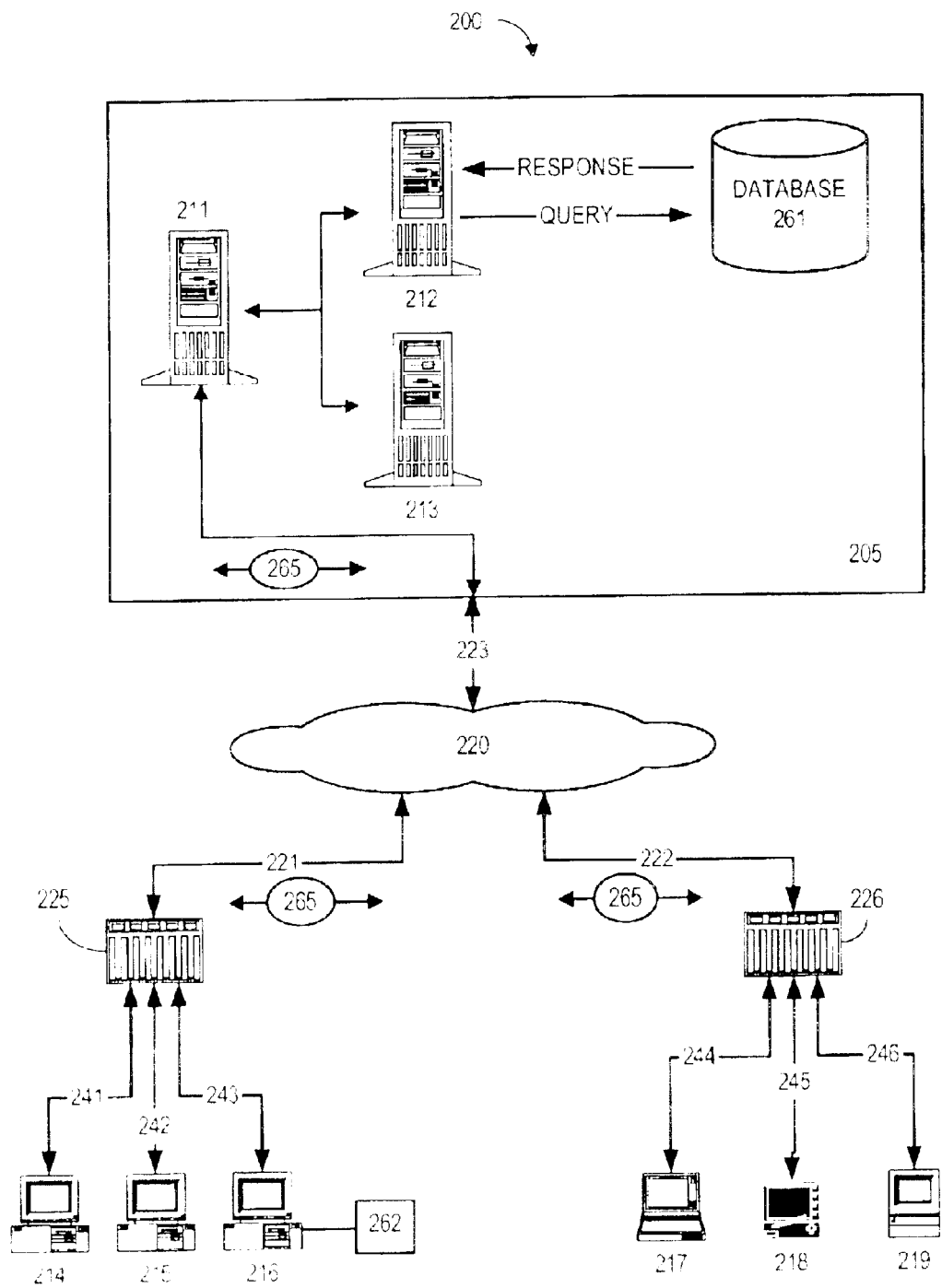
FIG. 2 illustrates a communications network.

A collection of computers 100 can serve as components of a communications network. Referring to FIG. 2, a communications network 200 can include network access devices such as client computers 211–213 that are part of a local area network 205, independent computers 214–216 and other network access devices 217–219. Other network access devices can include, for example, cellular communications devices, interactive WEB devices, portable handheld devices or any device that provides communication on an electronic communication network such as the Internet.

A network agent can include a person or machine seeking to communicate over the communications network 200. Agents can communicate via a network access device 211–219. Network communication can be accomplished over a medium such as a combination of public switched telephone network dial-up connections and packet network interconnections. Network access devices 211–219 can connect through dial-up, direct cable access, wireless technologies, satellite or other communications media. A terminal server 225 or 226 may have both dial-up and packet network interfaces allowing the server 225 or 226 to receive data from network access devices 214–216 and 217–219, respectively, segment the received data into data packet segments, add overhead information to the segments, and send the resultant data packets over a link 221 to a packet data network 220 for delivery to the local area network 205. Terminal servers 225 and 226 may also be referred to as a network service provider's Point-Of-Presence (POP). A registry 262 can reside on any network access device 211–219 to list and coordinate resources available on the network.

Software code operative with a processor on a network access device 211–219 can provide a personal network (PeN) with a uniform network access mechanism, such as a Uniform User Interface (UUI), to access local resources or resources available via the communications network 200.

The UUI an be used across multiple software platforms and access device types to facilitate sharing resources and sending and receiving data. Establishing and maintaining a communications link between two or more network access devices 211–219 enables a UUI to manage data queries, messaging, chat and other application requests. Utilization of a multi-platform software language, such as the Java programming language, allows the UUI to present a universal interface to a user. The universal interface frees a user from having to learn a different interface for each operating system such as DOS™, Windows 95™, Windows NT™, UNIX™, Apple Mac OS™ or other operating systems.

A UUI can operate directly on a network access device 211–219 to eliminate the need for a specialized server dedicated to performing communications functions. Communications can be established directly between participating network access devices 211–219. Each network access device 211–219 can specify the extent to which it will make its resources available and participate in activities such as network chat and messaging.

Figure 4:
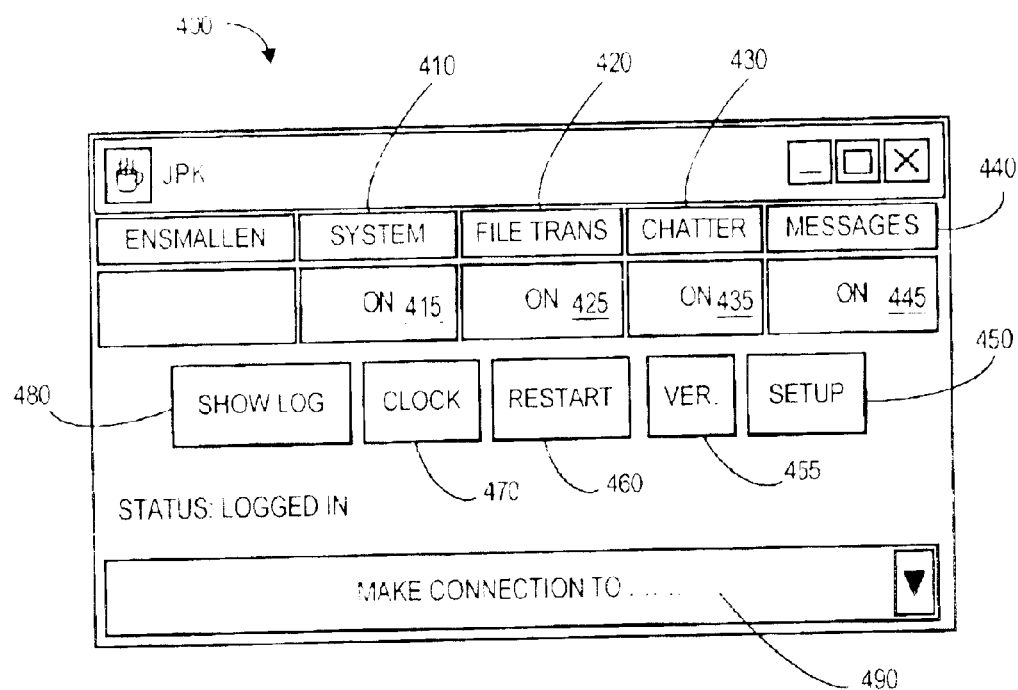
FIG. 4 shows a Uniform User Interface.

Referring now to FIG. 4, program code can be executed on a network access device 211–219 to present a UUI 400 to an agent. The UUI 400 can include user interactive controls, such as a push button icons, to facilitate operation of PeN functions. PeN functions can include system application programs 410, file transfer 420, chat sessions 430, messaging 440 or other discrete services. User interactive controls can also be utilized to offer UUI 400 specific functions such as displaying a log 480, displaying a clock 470, re-starting a PeN session 460, displaying a software version 455 or entering a setup utility 450. In addition, the UUI 400 can include user interactive controls for PeN functions. For example, a button may be used to enable or disable system application programs 415, file transfer 420, chat sessions 435 and messaging 445. Restarting a session can include an automated download of a new version of PeN and running the new version with minimal intrusion to the user.

Figure 3:
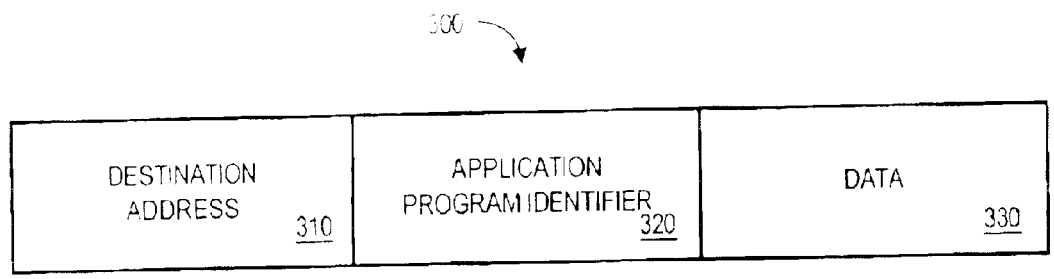
FIG. 3 illustrates a PeN address.

A UUI can also include a drop down menu 490 of resources available on the PeN or locally on the network access device 211–219. A resource available on the PeN can be accessed by choosing it from a resource drop down menu 490 or by specifying a destination PeN address. A PeN address identifies the location at which a resource can be located. In one embodiment, as illustrated in FIG. 3, a PeN address can include a destination address 310 concatenated with an application program identifier 320. The destination address 310 can be a network address such as an IP address specifying a network access device 211–219 on which a resource is being made available. The application program identifier 320 can be a port number associated with an application program administering the resource.

To commence communications, the UUI 400 can poll a network 200 to determine whether a network access device 211–219 with which an originating agent wishes to communicate is available. Polling can be accomplished, for instance, with a ping of an IP address portion of a PeN address. A successful ping can signify that a corresponding resource is online and available.

Figure 5:
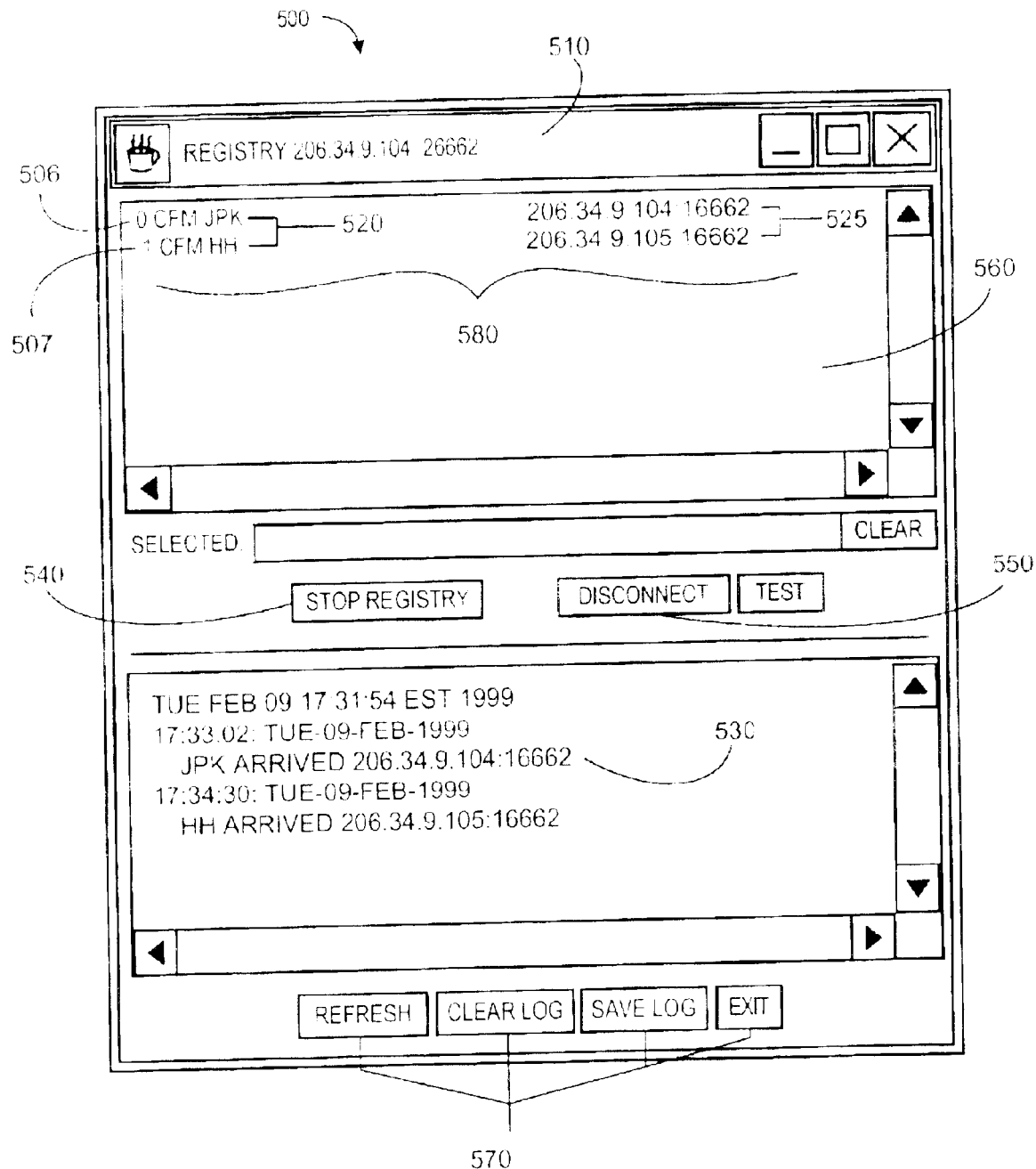
FIG. 5 shows a PeN Registry.

Referring now to FIG. 5, PeN addresses maintained in a registry 262 can be displayed in an interface 500 to facilitate location of various agents 506 and resources 507. A registry 262 can include a name 520 or other identifier for each resource listed, and a PeN address 525 at which the identified resource can be communicated with. A PeN utilizing a registry 262 enables communication amongst the addresses 525 listed. In one embodiment, a menu 560 can be presented listing available resources 580. Selection of a resource 580 from the registry can automatically open a communication session with that resource 580. A PeN can include one or more available agents 506. In a multi-agent PeN, communication can be directed to an individual destination or to multiple destinations. In addition, an agent can participate in more than one PeN simultaneously.

The interface 500 can include an identifier 510. In one embodiment, the identifier can be indicative of the network access device 211–219 hosting the registry 262. Other embodiments can include a description of the agents 506 and resources 507 listed, or an arbitrary name. A registry interface 500 can include a region displaying user interactive controls such as push buttons 570. Push buttons 570 can actuate registry functions such as refresh the display, clear the log, save the log and exit.

Human agents, robotic agents, and other resources utilizing a PeN registry 262 can be identified by multiple identification data, including a short "user-name" to uniquely identify a user to a registry; an optional password that can enable a registry to verify a user's identity; a user's full name, location, affiliations and/or other details provided by the user; or an optional digital portrait or other digital image of the user.

Identification data items can be made available to users of the registry 262, whereby correspondents may be identified by their real names and likenesses, obviating the need to memorize user-names or email addresses.

A network access device 211–219 hosting a registry 262 may poll agents 506 and resources 507 listed on the registry periodically and update the availability of the agents 506 and resources 507 listed according to the results of the poll. For example, a network access device 211–219 may publish a registry 262 that allows agents 506 to log in and declare an address 525 at which they can be reached. In addition, the registry 262 may list other resources 507, such as a database or file library. A poll may consist of a ping on a periodic basis to ascertain the continued presence of an agent 506 or resource 507. In addition, a network access device 211–219 can ping a registry on a periodic or other basis. A successful ping will certify that the registry is accurate.

In one embodiment, a network access device 211–219 with a permanent PeN address 525 maintains a registry 262 allowing other agents 506 listed in the registry 262 to declare their current PeN address 525 as an agent 506 becomes available online. The permanent address of the network access device 211–219 maintaining the PeN can act as a known origination point for the PeN.

In other instances, a network access device 211–219 with a permanent address may not be available, and a network access device 211–219 with a temporary PeN address 525 will publish a registry 262. The temporary address 525 needs to be conveyed to an agent 506 seeking to log into the registry 262. A temporary PeN address 525 can be considered via email, telephone, bulletin board or other communications method. Moreover, a temporary address might be, for example, allocated by the Dynamic Host Configuration Protocol (DHCP) mechanism.

In one embodiment, multiple network access devices 211–219 included in a PeN will host a registry 262 concurrently. One of the registries 262 can be active and coordinate the communications. However, messaging or other PeN functions do not flow through the registry. The registry simply coordinates network access devices 211–219 and PeN resources. In the event the network access device 211–219 hosting the active registry 262 drops out, another registry 262 can automatically become active. In addition, an active registry 262 can proactively transfer the active status to another registry 262.

Figure 6:
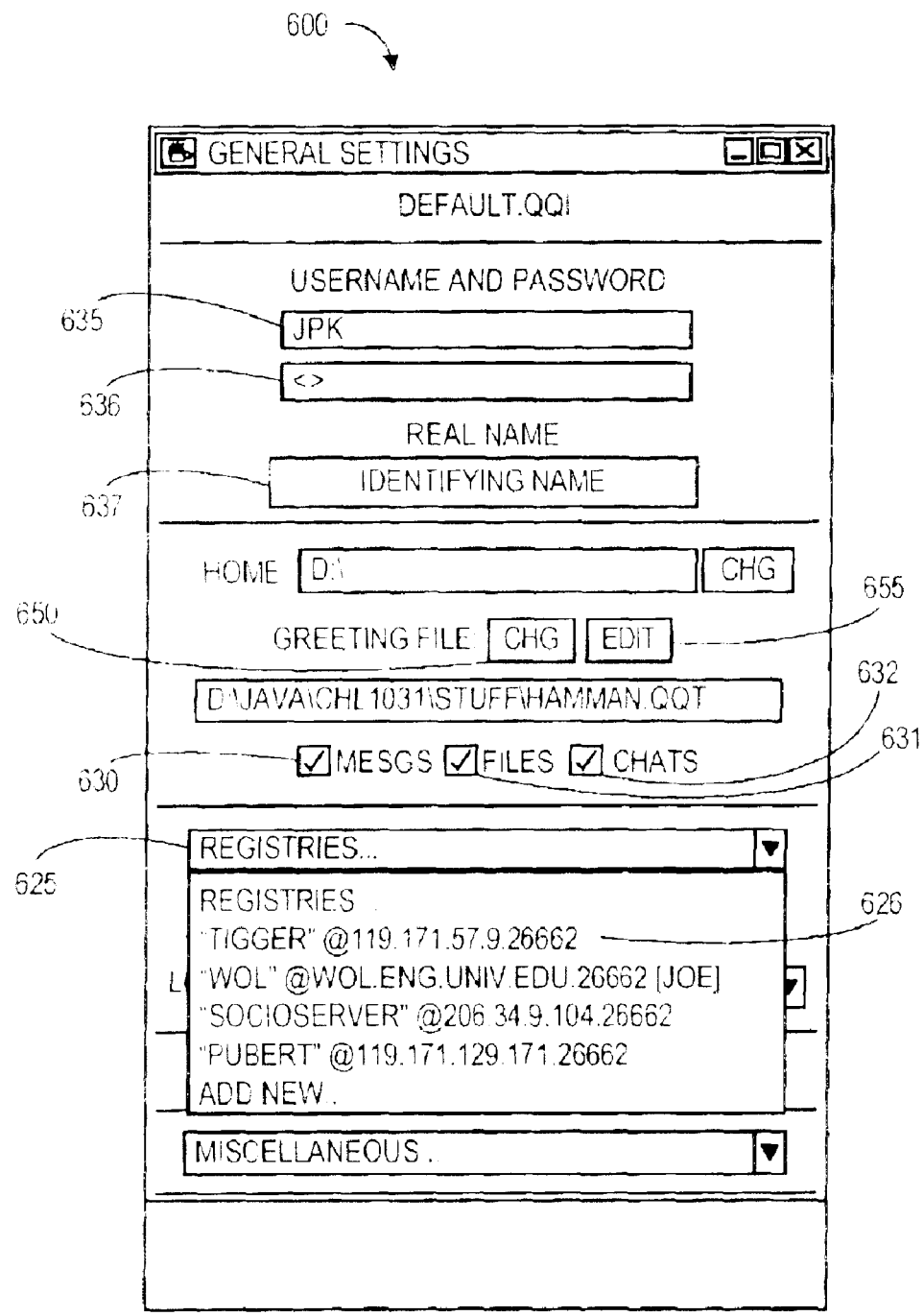
FIG. 6 shows a PeN General Settings display.

Referring now to FIG. 6, a General Settings display 600 can display PeN information. The General Settings 600 can include the user-name of an agent 635, a password 636 and an actual name 637. The General Settings 600 can also include user interactive controls such as check boxes to enable PeN functions such as messaging 630, file transfer 631 and chat sessions 632. In addition, a drop down menu or other listing of available registries 625 can be included. Selecting a registry by clicking on a listed registry 626 can log an agent into the selected registry 626. A function to change 650 or edit 655 a greeting presented to an agent loc into a PeN registry can also be included in the General Settings 600.

Figure 7:
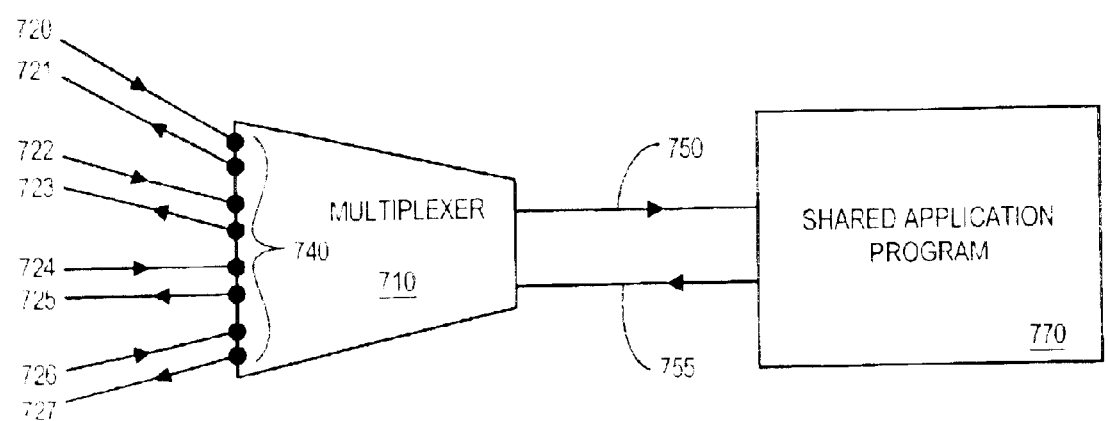
FIG. 7 illustrates a PeN multiplexer.

Referring now to FIG. 7, a network access device 211–219 making a resource such as a database, chat session or other shared application 770 available to access by other agents 506 can accommodate multiple concurrent access with a resource sharing mechanism such as a multiplexer 710.

A multiplexer 710 can manage multiple streams 720–727 of data being received and sent. Each data stream 720–727 is conveyed via a communications link such as an Internet socket 740. A data stream 720–727 can include one or more data packets 265 received from a network agent. A packet 265 is collected from an input stream 720, 722, 724 or 726, as it is received and transferred to a single input line 750 of communication providing input to a shared application 770. Responses from the shared application 770 are directed back on an output stream 755 through the multiplexer 710 to an output stream 721, 723, 725, 727 connected to the original Internet socket 740 from which it was received.

One embodiment of a multiplexer 710 utilizes a software program, such as a Network Agent software program, to initiate new corrections, construct a network socket 740 with associated input and output streams 720–727, and connect them as a triplet to a multiplexer IOStreamList 720–727. The multiplexer 710 can continuously scan the list. A communication received from the input stream on this list is transmitted to the shared resource. Responses are transmitted on an associated output stream. When a session is terminated, the multiplexer 710 closes the associated socket and removes its triplet from the list. A typical programming loop for a multiplexer is illustrated in Table 1.

TABLE I

Main Loop:

1. While message queue from application is not empty:
   A. remove response and tag from queue,
   B. identify output stream corresponding to tag,
   C. transmit response on that output stream, and
   D. discard response and tag.
2. When message queue from application is empty: Start scanning IOStreamList from beginning.
   For each triplet:
   A. While inputstream is not empty:
      I. receive input from inputstream;
      II. if input is request to terminate:
          a. close corresponding socket,
          b. remove triplet from IOStreamList;
      III. otherwise (not a request to terminate):
          a. generate tag identifying this triplet.
          b. send input and tag on message queue to application.

TABLE I-continued

Main Loop:

B. When inputstream is empty:
    Move on to next triplet when at end of IOStreamList.

Figure 8:
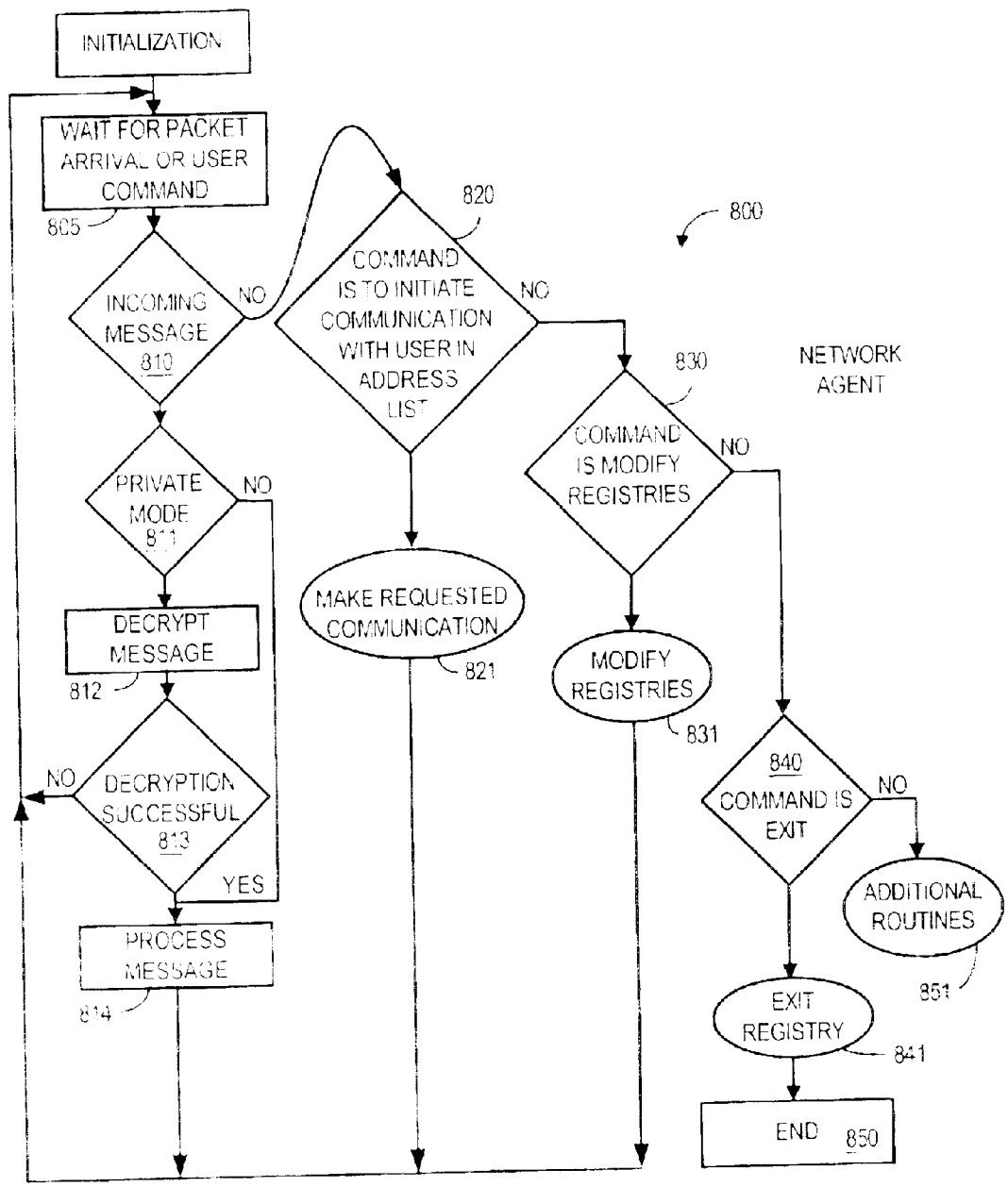
FIG. 8 illustrates an exemplary program flow for a network agent.

Referring now to FIG. 8, a flow diagram 800 illustrates one embodiment of a process for receipt of a data packet 265 by a network access device 211–219. An agent can wait for a packet arrival or user command 805. If a packet is received it can be tested 810 to determine if it is a message. If it is a message, the message can be tested for private mode 811 indicating encryption. If the message is received encrypted, it can be decrypted 812 and processed 814. Processing can include displaying the content of the message or other action indicated by the message. If the input is a user command, it can be tested to determine if it is a command to initiate communication with an agent 506 listed in the registry address list 820. If it is, the communication requested can be made 821. If the input is not a command to initiate communication 820, it can be tested to see if it is a command to modify the registry 830. If it is a command to modify, the registry 830, the registry can be modified accordingly 831. If it is not, the packet 265 can be tested for a command to exit 840 or proceed to additional routines 851. Data packets 265 can also include email. A network agent can additionally be programmed to receive, send, store, archive and otherwise participate in email.

Figure 9:
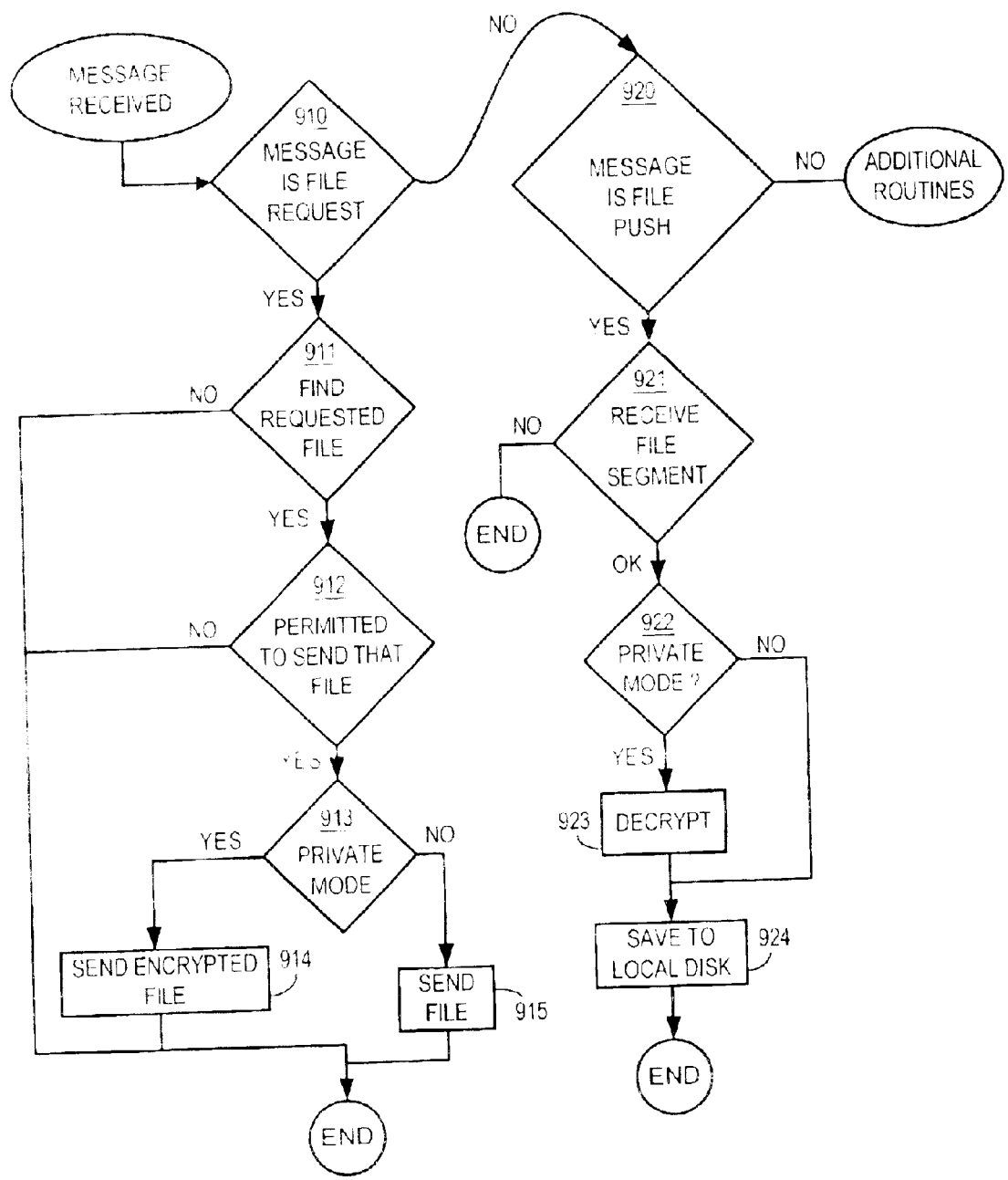
FIG. 9 illustrates an exemplary program flow for network functions.

Referring to FIG. 9, a file request 910 received by an agent can be responded to with a search for the file 911, a test for permission to send a particular file found to the requestor 912, a check to see if encryption is appropriate 913, and if all conditions are met, sending the file to the requester 914 or 915. In response to a request to push a file 920, the file can be received 921 and tested for private mode indicating encryption 922. If appropriate, it can be decrypted 923 and saved to local disk 924.

Figure 10:
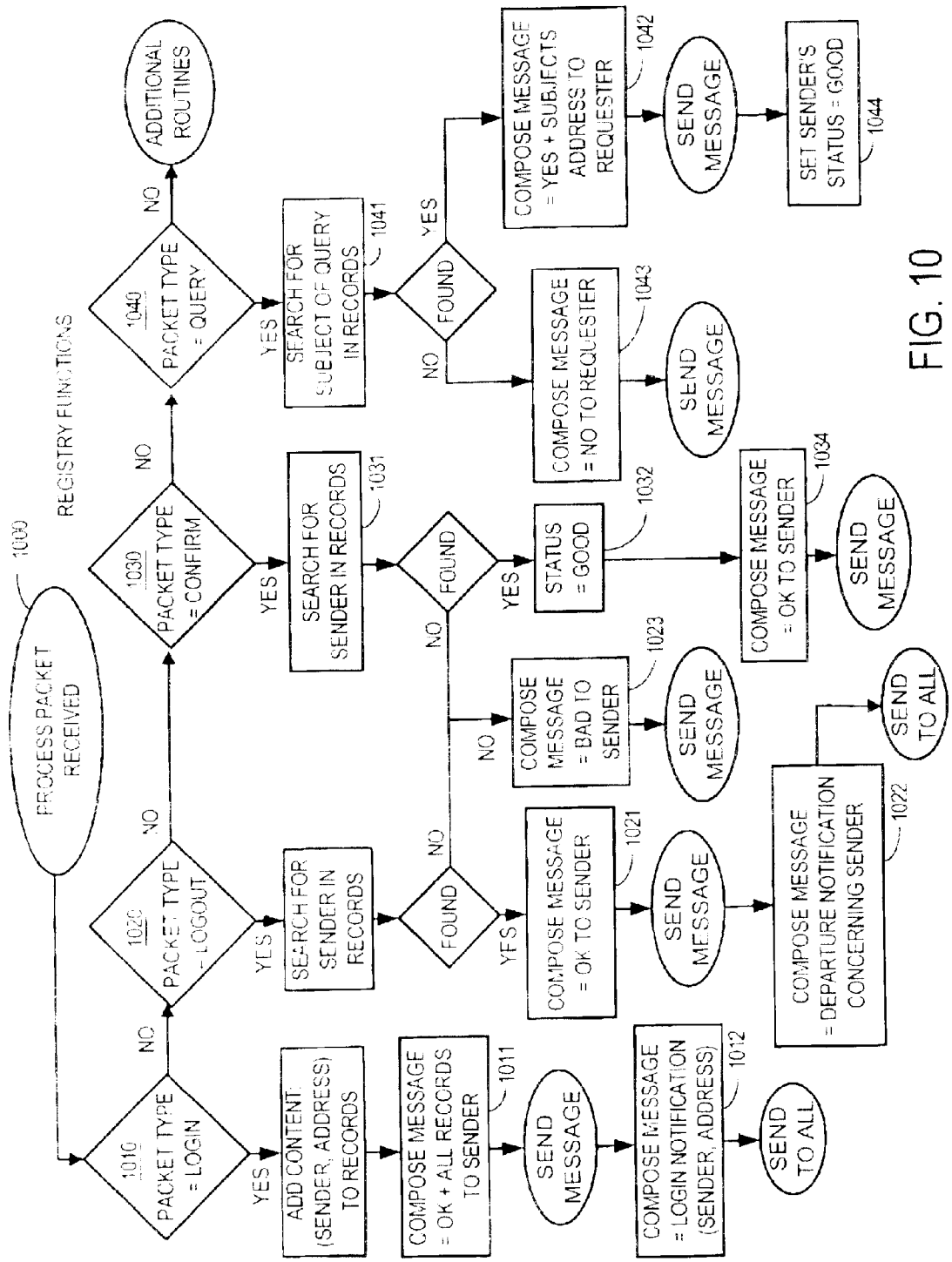
FIG. 10 illustrates an exemplary program flow for registry functions.

Referring now to FIG. 10, which illustrates functions of a registry for processing a packet requesting login 1010, logout 1020, confirmation 1030 or database query 1040. A login request 1010 may receive a response of an OK message and a list of records representing all agents logged in 1011. A logout request may be responded to with an OK message back to sender 1021 and a notification to all other agents 1022. A confirmation request 1030 may receive a search 1031, a status set equal to good 1032 and an OK message back to the sender 1034. A database query request 1040 response may be a query search 1041 and a positive response 1042 or negative response 1043 sent back to the requester. A completed transaction can also be used to confirm a sender's status as good 1044.

The above flow illustrations are exemplary and should not be viewed as limiting. Data packet 265 formats, switching equipment within the packet network 220, and networking protocols used within the network 200 may conform to the transaction control protocol/Internet protocol (TCP/IP). In a TCP/IP implementation, the local area network 205, packet network 220, and terminal servers 225, 226 can each be assigned a unique IP network address. Implementations may use other networking protocols and packet formats.

The present invention may be implemented in digital electronic circuitry, or in computer hardware, firmware, software, or in combinations thereof. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. Note that the computer program might be transmitted from a server to a user device (e.g., his or her PC) and then locally stored and executed.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object oriented programming language, or in assembly or machine language if desired; and, in any case, the language may be a compiled or interpreted language. Suitable processors include, by way of example, both general and special purpose microprocessors. Generally, a processor will receive instructions and data from a ROM and/or a RAM. Storage devices suitable for tangibly embodying computer program instructions and data include all forms of non-volatile memory, including, by way of example, semiconductor memory devices, such as EPROM and flash memory devices, magnetic disks such as internal hard disks and removable disks, magneto-optical disks; and CD-ROM disks. Any of the foregoing, may be supplemented by, or incorporated in, specially-designed Application Specific Integrated Circuits (ASICs).

A number of embodiments of the present invention have been described. Nevertheless, it will be understood that various modifications may be made without departing from the spirit and scope of the invention. For example, various application programs can be accessed as resources by a network access device 211–219, or a network access device 211–219 may be a receive only device. Commands can be forwarded to a receive only device to control a function of the device, however, no response is received back from a receive only device.

According to some other embodiments, the resource that is shared in a peer-to-peer fashion is an interface application that is controlled by (or communicating with) a human user or an automated process. For example, an automated process might use artificial intelligence techniques to simulate human operators, such as to provide basic customer service when no human representatives are available (e.g., technical support) or acting on the behalf of a human user to transact business.

Moreover, the resource may provide controlled or uncontrolled access to traditional software applications, such as database systems, spread-sheets, and search engines. For example, the resource might valid a user name and/or password before letting that user access information.

According to one embodiment, the resource is associated with a common depository of messages from a plurality of other agents, creating a "bulletin-board" service.

According to still other embodiments, the resource is associated with a remote shopping service, guiding users through a collection of commercial wares (e.g., products and services). For example, users might receive graphical representations, descriptions, pricing information, and other information about products and services. Moreover, the resource might facilitate a sale of such items to a user.

According to yet other embodiments, the resource lets human users at remote locations communicate in various ways, including typed words, speech, pictures, and transmitted files. In this case, the resource might store a historic record of previous interactions with the same correspondent or correspondents, such that each new message appears in its proper conversational context. In this way, a consistent record of an entire long-term interaction might be created (e.g., including text, graphical elements, and/or file transfers). Moreover, the historical record might contain time-stamps indicating when each transaction was sent and/or received. In addition, the record might use encryption and other techniques to ensure that it is a complete and accurate record (e.g., to prevent unauthorized tampering). According to another embodiment, users might be allowed to modify the historical record (e.g., to provide a mechanism for collaborative writing).

In another embodiment, the resources are intermediary applications, receiving transmissions from a plurality of other resources and forwarding them unmodified to corresponding other resources, providing a controlled bridge or access point suitable for crossing firewalls.

Transmissions between resources may be encrypted, digitally signed, or subject to other security measures.

What is claimed:

1. A method, comprising:
    displaying to a user at a first user network access device a registry of resources available from a plurality of remote user network access devices via a communications network;
    associating at the first user network access device a personal network address with each available resource, wherein the personal network address includes a destination address portion and an application program identifier portion; and
    establishing a direct communications link between a second user network access device hosting an available resource and the first user network access device using the personal network address associated with the resource.

2. The method of claim 1, wherein the destination address portion comprises an Internet Protocol address and the application program identifier portion comprises a port number.

3. The method of claim 1, wherein the resource is an interface application associated with at least one of a human and an automated process.

4. The method of claim 1, wherein the resource is a service application.

5. The method of claim 4, wherein the service application provides access to at least one of: (i) a database system, (ii) a spread sheet, and (iii) a search engine.

6. The method of claim 4, wherein the service application provides an access control function.

7. The method of claim 1, wherein the resource comprises a common depository of messages from a plurality of agents.

8. The method of claim 1, wherein the resource enables communication between agents at remote network access devices.

9. The method of claim 8, wherein the communication includes at least one of: (i) text information, (ii) audio information, (iii) image information, and (iv) executable information.

10. The method of claim 8, wherein at least one of the agents comprises a user.

11. The method of claim 8, wherein at least one of the agents comprises an automated process.

12. The method of claim 11, wherein the automated process uses artificial intelligence techniques to simulate a human operator.

13. The method of claim 8, wherein a secure communication history is maintained.

14. The method of claim 13, wherein the secure communication history is associated with at least one of; (i) encrypted communication, (ii) signed communication, and (iii) a time stamp.

15. The method of claim 8, wherein a modifiable communication history is maintained.

16. A medium storing instructions adapted to be executed by a processor to perform a method, said method comprising:

displaying to a user at a first user network access device a registry of resources available from a plurality of remote user network access devices via a communications network;

associating at the first user network access device a personal network address with each available resource, wherein the personal network address includes a destination address portion and an application program identifier portion; and establishing a direct communications link between a second user network access device hosting an available resource and the first user network access device using the personal network address associated with the resource.

17. The medium of claim 16, wherein the destination address portion comprises an Internet Protocol address and the application program identifier portion comprises a port number.

18. The medium of claim 16, wherein the resource is an interface application associated with at least one of a human and an automated process.

19. A method of accessing resources available from a plurality of remote user network access devices via a communications network, comprising:

retrieving at a first user network access device registry information from another remote user network access device that hosts an active registry, the registry information including a personal network address for each of a plurality of available resources, wherein each personal network address includes a destination address portion and an application program identifier portion;

displaying to a user at the first user network access device a registry of available resources;

receiving from the user an indication of a selected resource; and establishing a direct communications link between a second user network access device associated with the selected resource and the first user network access device using the personal network address associated with the selected resource.

20. A method, comprising:

forming at a first user network access device a registry of resources available in a network of remote user network access devices;

associating at the first user network access device personal network addresses for resources in the registry;

receiving at the first user network access device a request from a second user network access device; and transmitting from the first user network access device to the second user network access device a set of personal network addresses associated with available resources, wherein each personal network address includes a destination address portion and an application program identifier portion.

21. The method of claim 20, further comprising:

determining that the registry at the first user network access device is an active registry.

22. The method of claim 21, further comprising:

arranging for another registry at another user network access device to become the active registry.

\* \* \* \* \*